(12) United States Patent
Rudhardt et al.

(10) Patent No.: US 9,540,524 B2
(45) Date of Patent: Jan. 10, 2017

(54) PRODUCTION OF DISPERSIONS CONTAINING CARBON NANOTUBES

(75) Inventors: Daniel Rudhardt, Köln (DE); Stefanie Eiden, Leverkusen (DE); Sigrun Stein, Leverkusen (DE); Gertrud Ott, Köln (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 497 days.

(21) Appl. No.: 13/876,693

(22) PCT Filed: Oct. 4, 2011

(86) PCT No.: PCT/EP2011/067289
§ 371 (c)(1),
(2), (4) Date: Apr. 19, 2013

(87) PCT Pub. No.: WO2012/045727
PCT Pub. Date: Apr. 12, 2012

(65) Prior Publication Data
US 2013/0200310 A1    Aug. 8, 2013

(30) Foreign Application Priority Data

Oct. 8, 2010  (DE) ........................ 10 2010 042 209

(51) Int. Cl.
| | |
|---|---|
| *C01B 31/02* | (2006.01) |
| *H01B 1/04* | (2006.01) |
| *H01B 1/24* | (2006.01) |
| *B82Y 40/00* | (2011.01) |
| *C09D 5/24* | (2006.01) |
| *B82Y 30/00* | (2011.01) |

(52) U.S. Cl.
CPC ................. *C09D 5/24* (2013.01); *B82Y 30/00* (2013.01); *B82Y 40/00* (2013.01); *C01B 31/0273* (2013.01); *C01B 2202/28* (2013.01)

(58) Field of Classification Search
CPC ......... H01B 1/04; H01B 1/24; C01B 2202/28; C01B 31/0273; B82Y 30/00; B82Y 40/00

USPC ....... 252/500–511; 423/445 R, 461; 977/742
See application file for complete search history.

(56) References Cited

U.S. PATENT DOCUMENTS

| | | |
|---|---|---|
| 5,747,161 A | 5/1998 | Iijima |
| 6,232,706 B1 | 5/2001 | Dai et al. |
| 6,294,144 B1 | 9/2001 | Moy et al. |
| 7,018,601 B2 | 3/2006 | Yanagisawa et al. |
| 7,744,793 B2 | 6/2010 | Lemaire et al. |
| 2005/0224764 A1 | 10/2005 | Ma et al. |
| 2006/0189822 A1* | 8/2006 | Yoon et al. .................. 560/130 |
| 2007/0292622 A1* | 12/2007 | Rowley et al. ............ 427/407.1 |
| 2009/0124705 A1 | 5/2009 | Meyer et al. |
| 2009/0226684 A1* | 9/2009 | Bahnmuller et al. ......... 428/206 |
| 2010/0059720 A1 | 3/2010 | Berkei et al. |
| 2011/0224113 A1* | 9/2011 | Pick et al. .................... 508/116 |
| 2012/0058889 A1* | 3/2012 | Nishino et al. ............... 502/328 |

FOREIGN PATENT DOCUMENTS

| | | |
|---|---|---|
| DE | 10 2006 055106 A1 | 5/2008 |
| DE | 10 2007 044031 A1 | 3/2009 |
| DE | 10 2008 008837 A1 | 9/2009 |
| EP | 198 558 A | 10/1986 |
| EP | 1 514 280 A1 | 3/2005 |
| WO | 86/03455 A1 | 6/1986 |
| WO | 2006/073420 A2 | 7/2006 |
| WO | 2009/100865 A1 | 8/2009 |
| WO | 2010/118896 A2 | 10/2010 |

OTHER PUBLICATIONS

International Search Report Dated Jan. 24, 2012, Mailed Feb. 1, 2012.
Translation of International Search Report Dated Jan. 24, 2012, Mailed Feb. 1, 2012.

* cited by examiner

*Primary Examiner* — Tri V Nguyen
(74) *Attorney, Agent, or Firm* — Norris McLaughlin & Marcus P.A.

(57) ABSTRACT

Process for the preparation of stable suspensions and dispersions of carbon nanotubes, and dispersions prepared by the process.

3 Claims, 3 Drawing Sheets

PRODUCTION OF DISPERSIONS CONTAINING CARBON NANOTUBES

The present invention relates to a process for the preparation of stable suspensions and dispersions of carbon nanotubes in high concentration and with low viscosity.

Suspensions and dispersions are together referred to hereinbelow by the term "dispersion" or "dispersions".

BACKGROUND OF THE INVENTION

Carbon nanotubes (CNTs) are known for their extraordinary properties. For example, their strength is approximately 100 times that of steel, their thermal conductivity is approximately as great as that of diamond, their thermal stability reaches as high as 2800° C. in vacuo, and their electrical conductivity can be a multiple of the conductivity of copper. However, these structure-related characteristics are frequently only obtainable on a molecular level when carbon nanotubes can be distributed homogeneously and the greatest possible contact between the tubes and the medium can be produced, that is to say when the tubes can be rendered compatible with the medium and accordingly stably dispersible. With regard to electrical conductivity it is further necessary to form a network of tubes in which the tubes are ideally in contact or sufficiently close only at the ends. The carbon nanotubes are thereby to be present in as isolated a form as possible, that is to say without agglomerates, in a non-aligned manner and in a concentration at which such a network is able to form, which is reflected in the sudden increase in the electrical conductivity in dependence on the concentration of carbon nanotubes (percolation limit). An example of the direct use of conductive dispersions is conductive inks (see e.g. EP-A 1514280). Excellent dispersion and isolation of the carbon nanotubes is also required to achieve improved mechanical properties of composites such as, for example, in reactive resins such as epoxides, because larger agglomerates lead to fracture sites (Zhou, eXPRESS Polym. Lett. 2008, 2, 1, 40-48), and an impairment of the mechanical properties of such composites then tends to be observed.

For commercial applications, therefore, the incorporation of CNTs into liquid vehicles is of interest but is also a requirement. After their preparation, CNTs are present in the form of primary agglomerates. These primary agglomerates, which can have an order of magnitude of up to several millimeters, are initially not suitable for commercial use. In fact, they must be broken up so that the CNTs are present in isolated form and are able to form a stable dispersion and can be applied to the surface to be treated, for example in the form of thin layers. Isolated CNTs are also required to achieve desirable properties such as, for example, electrical conductivity.

For the successful preparation of stable dispersions of carbon nanotubes, therefore, the complete breaking up and unbundling of carbon nanotube agglomerates and—frequently—suppression of the high tendency of carbon nanotubes to re-aggregation is crucial if it is desired, by their use, to make a material electrically conductive, for example, and/or better in mechanical terms. Such dispersions must have different properties depending on the field of use. For example, for the use of inks in the inkjet printing process it is desirable for the residual agglomerate size to be sufficiently small that the nozzles do not become blocked. The same is true for a screen printing process, because agglomerates that are too large can lead to the formation of bridges on the screen and accordingly to blockages.

At the same time, however, a high concentration of CNTs in the dispersion is also desirable, in the case of conductive inks, for example, in order to make the printing operation as efficient as possible. There are two reasons for this: The wet layer thickness that can be achieved in a single step is limited with typical printing processes. The amount of CNTs which can be applied in a single printing step, and accordingly also the achievable conductivity per unit area, is therefore proportional to the CNT concentration in the dispersion. If a particular surface conductivity is required, it can require several printing operations, depending on the requirement and the printing process, which increases the outlay and may lead to problems with the accuracy of the printed structures. In CNT-containing starting products, a high concentration is desirable so that an adequate concentration can also be achieved in the end product.

It is additionally important for industrial use that a CNT dispersion is stable to the sedimentation of particles over a period of at least six months. For industrial applications, it is necessary to produce large amounts of dispersion, reaching the tonne scale. The production of such large amounts is not described in the literature.

CNT-containing dispersions can be prepared by various known techniques. Techniques known to the person skilled in the art are described, for example, in "Dispersion of Carbon Nanotubes in Liquids", Journal of Dispersion Science and Technology, Volume 24, Issue 1 Jan. 2003, pages 1-41.

The techniques presented there are:

Dispersion with ultrasound: This process is very popular for laboratory processes but has the disadvantage that the required energy inputs are very high and the performance of the available ultrasound devices is technically limited, so that industrial production is scarcely possible. In addition, the energy input is concentrated very locally, and broad particle size distributions result. With higher degrees of filling with CNTs, the increase in viscosity has the result that the mechanism of ultrasonic dispersion, which is based substantially on cavitation, is greatly diminished.

Ball milling: As stated in the article, this process has the disadvantage that the CNTs are greatly damaged, which has an adverse effect especially on properties such as conductivity.

Trituration: This method destroys the structure and hence the properties of the CNTs even more than ball milling.

High-pressure mixing: Dispersion in a valve for diesel engines (ASTM D5275) led to considerable destruction of the CNT structures.

WO-A 2009/100865 discloses a process for the preparation of conductive aqueous formulations containing carbon nanotubes and at least one polymeric dispersing aid, comprising at least the steps:

a) optional oxidative pre-treatment of the carbon nanotubes, b) preparation of an aqueous pre-dispersion by dissolving the polymeric dispersing aid in an aqueous solvent, introduction and distribution of carbon nanotubes in the resulting solution, c) introduction of a volume-related energy density, preferably in the form of shear energy, of at least $10^4$ J/m$^3$, preferably of at least $10^5$ J/m$^3$, particularly preferably from $10^7$ to $10^9$ J/m$^3$, into the pre-dispersion until the agglomerate diameter of the carbon nanotube agglomerates is substantially ≤5 µm, preferably ≤3 µm, particularly preferably ≤2 µm.

For step c), the preferred use of a high-pressure homogeniser is disclosed, the pre-dispersion preferably passing through the high-pressure homogeniser several times. A disadvantage of this process is that the maximum concentration to be obtained in the formulation corresponds to the maximum concentration which can be established in the pre-dispersion. Accordingly, in Example 3 of the application, by three separate passes through a high-pressure homogeniser, a dispersion of 0.5 gram of CNTs purified with $H_2O_2$ in 95 grams of polyvinylpyrrolidone solution is disclosed. The viscosity at a concentration of just below 0.53 wt. % is already 1.68 Pa*s at room temperature and a shear rate of 1/s. This low concentration of CNTs has the result that large amounts of water must be evaporated off in order to obtain a conductive coating. Because the viscosity of dispersions of CNTs increases greatly as the concentration of dispersed CNTs increases, a markedly higher viscosity is to be expected for higher CNT concentrations, which considerably limits the possibilities for commercial use. The conductivity achieved after drying was 3000 S/m.

US 2005/0224764 A1 describes CNT dispersions which, after application to a surface and drying, are electrically conductive and, owing to their shear thinning properties, are suitable, for example, for screen printing. The dispersions contain a carrier material (water or an organic solvent), a polymeric binder, typically a dispersing aid. The conductivities described in this application correspond, after conversion, approximately to those of WO 2009/100865. It is disclosed that the CNT dispersions can contain from 0.1 to 5% CNTs. However, it is also described in US 2005/0224764 A1 that the viscosity increases as the content of CNTs increases. This is also the reason why the dispersions are prepared first by pre-dispersion, by means of ultrasound, of a dilute solution containing not more than 0.5% CNTs, and only then by subsequent concentration and further dispersion by means of a milling process, in which the CNTs are shortened. In the examples given in the application, the CNT content is a maximum of 3.5 wt. %, in most cases 2.5 wt. % or less, and higher concentrations cannot be established in satisfactory quality by the mentioned process, even if it were desirable in some cases for the reasons mentioned above.

SUMMARY OF THE INVENTION

The object of the present invention, starting from the prior art, was, therefore, to develop a process with which CNT dispersions can be prepared in high CNT concentrations, with sufficiently low viscosities and good conductivities. In addition, the process is also to permit the economic preparation of large amounts of CNT dispersions having the above-mentioned properties, that is to say is to be usable on a large scale.

Surprisingly, the object has been achieved by a process which comprises the following steps:
1. Preparation of a mixture of dispersing agent, dispersing aid and, optionally, carbon nanotubes.
2. If carbon nanotubes have been added in step 1, optional pre-dispersion of the mixture from step 1.
3. Dispersion of the mixture from step 1 or of the pre-dispersed mixture from step 2—both referred to as "mixture" hereinbelow—wherein the dispersion is carried out with a high-pressure homogeniser and wherein all or part of the mixture is guided in a loop during the dispersion and further CNT agglomerates are thereby added continuously or discontinuously to the mixture. When the desired concentration of CNTs has been established in the dispersion, the addition of the CNT agglomerates is terminated. An "initial dispersion" is obtained.
4. The initial dispersion obtained in step 3 is subjected to further dispersion in the high-pressure homogeniser, optionally in loop mode. The "final dispersion" is obtained.

DETAILED DESCRIPTION

Figure 1:
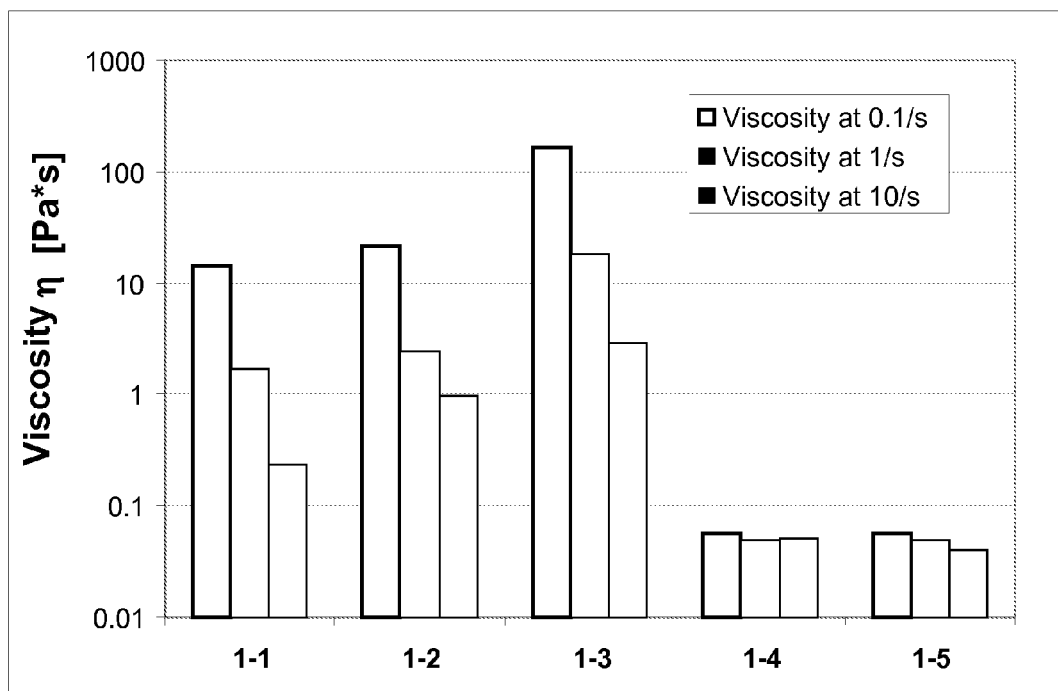
FIG. 1 illustrates viscosity values from Example 1, in graphical form.

Carbon nanotubes within the scope of the invention are any single-walled carbon nanotubes (SWNTs) or multi-walled carbon nanotubes (MWNTs), for example of the cylinder type as described, for example, in U.S. Pat. No. 5,747,161; WO 86/03455, of the scroll type, multiscroll type, cup-stacked type consisting of conical cups which are closed on one side or are open on both sides (e.g. in EP-A 198,558 and U.S. Pat. No. 7,018,601 B2), or with an onion-type structure. There are preferably to be used multi-walled carbon nanotubes of the cylinder type, scroll type, multiscroll type and cup-stacked type or mixtures thereof, and in particular mixtures containing the multiscroll type as described below. It is advantageous for the carbon nanotubes to have a length to outside diameter ratio of ≥5, preferably ≥100.

In contrast to the known carbon nanotubes of the scroll type already mentioned, which have only one continuous or broken graphene layer, there also exist carbon nanotube structures which consist of a plurality of graphene layers, which are combined to form a stack and are in rolled-up form. The term multiscroll type is used here. Such carbon nanotubes are described in DE 10 2007 044031 A1, the entirety of which is incorporated herein by reference. This structure behaves relative to the carbon nanotubes of the simple scroll type like the structure of multi-walled cylindrical carbon nanotubes (cylindrical MWNTs) relative to the structure of single-walled cylindrical carbon nanotubes (cylindrical SWNTs).

Unlike in the onion-type structures, it will be seen that the individual graphene or graphite layers in these carbon nanotubes, when viewed in cross-section, run continuously from the centre of the carbon nanotubes to the outside edge without a break. This can permit, for example, improved and more rapid intercalation of other materials into the tube structure because more open edges are available as entry zones for the intercalates as compared with carbon nanotubes having a simple scroll structure (Carbon 1996, 34, 1301-3) or CNTs having an onion-type structure (Science 1994, 263, 1744-7).

In an embodiment, the carbon nanotubes are used in functionalised form. The functionalisation of carbon nanotubes is known. Various methods are described, for example, in an overview article by N. Tsubokawa (Polymer Journal 2005, 37, 637-655).

It is provided according to the invention that, in step 1., the carbon nanotubes are provided in the form of agglomerates. The agglomerated form is the form of carbon nanotubes in which they are available commercially. A distinction can be made between several structural types of agglomerates (see e.g. Moy U.S. Pat. No. 6,294,144B1): the bird's nest structure (BN), the combed yarn structure (CY), and the open net structure (ON). Further agglomerate structures are known, for example one in which the carbon nanotubes are arranged in the form of bundled-up yarns (Hocke, WO PCT/EP2010/004845). Also described are nanotubes which are aligned in parallel over surfaces in the form of carpets or forests, so-called "forest" structures (e.g. patent Dai U.S. Pat. No. 6,232,706 and Lemaire U.S. Pat. No. 7,744,793B2). The adjacent tubes are here aligned predominantly parallel to one another. The mentioned agglomerate forms can be mixed with one another as desired or used as a mixed hybrid, that is to say different structures within one agglomerate.

The agglomerates provided have an average agglomerate size of ≥0.02 mm. This value can be determined by means of laser diffraction spectroscopy (an example of a device is the Mastersizer MS 2000 with Hydro S dispersion unit from Malvern; in water). The upper limit of the agglomerate size can be, for example, ≤6 mm. Preferably, the average agglomerate size is from ≥0.05 mm to ≤2 mm and more preferably from ≥0.1 mm to ≤1 mm.

The dispersing agents used in the process are inorganic or organic compounds which are liquid at room temperature, for example solvents. Examples of solvents are water, acetone, nitriles, alcohols, dimethyl-formamide (DMF), N-methylpyrrolidone (NMP), pyrrolidone derivatives, butyl acetate, methoxypropyl acetate, alkylbenzenes and cyclohexane derivatives. The dispersing agent can be in the form of the pure substance or it can itself be a solution or dispersion. Further preferred are also substances which represent or contain a component of a reactive system. Particular mention may be made here of polyols, isocyanates, epoxides, amines and phenols, which are reacted to give polyurethane, epoxy or phenolic resins. The dispersing agent can also be a substance which is conventionally incorporated into polymers. Examples of this latter case are flameproofing agents, demoulding agents, plasticisers, stabilisers or other additives conventional in the polymer industry, without a solvent, in the form of a dispersion or in a solvent. Depending on the use of the dispersions, additives such as carbon blacks in graphite or amorphous form, conductive salts, colourings, stabilisers, processing aids, etc. can also be added.

The dispersing aid is a polymeric or non-polymeric dispersing aid. For example, a polymeric dispersing aid can be selected from the group: water-soluble homopolymers, water-soluble random copolymers, water-soluble block copolymers, water-soluble graft polymers, in particular polyvinyl alcohols, copolymers of polyvinyl alcohols and polyvinyl acetates, polyvinylpyrrolidone, cellulose derivatives such as, for example, carboxymethylcellulose, carboxypropylcellulose, carboxymethylpropylcellulose, hydroxyethylcellulose, starch, gelatin, gelatin derivatives, amino acid polymers, polylysine, polyaspartic acid, polyacrylates, polyethylene sulfonates, polystyrene sulfonates, polymethacrylates, polysulfonic acids, condensation products of aromatic sulfonic acids with formaldehyde, naphthalene sulfonates, lignin sulfonates, copolymers of acrylic monomers, polyethyleneimines, polyvinylamines, polyallylamines, poly(2-vinylpyridines), block copolyethers, block copolyethers with polystyrene blocks, and polydiallyldimethylammonium chloride.

The at least one polymeric dispersing aid is preferably at least one agent selected from the group: polyvinylpyrrolidone, block copolyethers and block copolyethers with polystyrene blocks, carboxymethylcellulose, carboxypropylcellulose, carboxymethylpropylcellulose, gelatin, gelatin derivatives and polysulfonic acids. Preferred dispersing aids are polyvinylpyrrolidone, carboxymethyl-cellulose, as well as salts of polysulfonic acids and ligninsulfonic acid.

In an embodiment, polyvinylpyrrolidone and/or block copolyethers with polystyrene blocks are used as polymeric dispersing aids. Polyvinylpyrrolidone that is particularly suitable has a molar mass $M_a$ in the range from 5000 to 400,000. There are suitable, for example, PVP K15 from Fluka (molar mass about 10,000 amu) or PVP K90 from Fluka (molar mass of about 360,000 amu) or block copolyethers with polystyrene blocks, with 62 wt. % $C_2$ polyether, 23 wt. % $C_3$ polyether and 15 wt. % polystyrene, based on the dried dispersing aid, with a ratio of the $C_2$ polyether to $C_3$ polyether block lengths of 7:2 units (e.g. Disperbyk 190 from BYK-Chemie, Wesel).

The amount of dispersing aid required is dependent on the type of dispersing aid and the amount of CNTs used. A ratio of dispersing aid to CNTs of from 0.5:1 to 1:1 is preferred. In preferred embodiments, the dispersing aid is present in a concentration of from 2 to 10 wt. %. In other particular embodiments of the dispersions according to the invention, the dispersing aid is advantageously present in an amount of from 0.01 wt. % to 10 wt. %, preferably in an amount of from 0.1 wt. % to 7 wt. %, particularly preferably in an amount of from 0.5 wt. % to 5 wt. %, based on the total weight of the final dispersion.

The polymeric dispersing aids which are conventionally used and which are preferred are particularly advantageous in the indicated amounts because, as well as assisting with suitable dispersion of the carbon nanotubes, they also allow the viscosity of the dispersions according to the invention to be adjusted. The use of polymeric dispersing aids also allows adjustment of the surface tension and film formation and adhesion, which is useful, for example, when using the dispersions as inks.

The optional pre-dispersion in step 2 can be carried out by various, known methods. Examples are ultrasound, ball mills, a rotor-stator system or a homogeniser. A rotor-stator system or a homogeniser is preferred, and a high-pressure homogeniser is most particularly preferred.

The preparation of the initial dispersion in step 3 and the preparation of the final dispersion in step 4 are carried out in a high-pressure homogeniser.

Particularly suitable high-pressure homogenisers are known in principle, for example, from the publication Chemie Ingenieur Technik, Volume 77, Issue 3 (p. 258-262). Most particularly preferred high-pressure homogenisers are jet dispersers, narrow-gap homogenisers and high-pressure homogenisers of the Microfluidizer® type.

A high-pressure homogeniser comprises a pump and one or more nozzles. Particularly suitable high-pressure homogenisers are known in principle, for example, from the publication Chemie Ingenieur Technik, Volume 77, Issue 3 (p. 258-262).

The pump of a high-pressure homogeniser can be in the form of, for example, a piston pump, a gear pump or a hose pump. Piston pumps are preferred.

In a preferred variant, the CNT-containing mixture (containing dispersing agent, dispersing aid and CNTs) is fed to the pump of the high-pressure homogeniser by means of a feed pump in order to overcome the pressure loss as it flows into the pump of the high-pressure homogeniser. In a preferred embodiment, the feed pump is operated with a higher throughput than the pump of the high-pressure homogeniser. In this case, the CNT-containing mixture is preferably fed separately to the storage container again. A pressure retention valve is preferably used upstream of the return into the storage container in order to set the primary pressure upstream of the pump of the high-pressure homogeniser.

There are various options, known to the person skilled in the art, for the nozzles of a high-pressure homogeniser. Examples are aperture plates, jet dispersers (a special form of aperture plates in which the jets produced by the aperture plates come into contact with one another), special nozzle geometries such as, for example, the Microfluidizer™, and spring-loaded nozzle systems such as, for example, annular gap nozzles. Jet dispersers and annular gap nozzles are preferably used. A common feature of all the methods is the comminution effect as a result of the highly turbulent flow and, in addition, optionally cavitation.

The pressures which are used in the high-pressure homogenisers are generally from 50 to 4000 bar, preferably from 100 to 2000 bar and most particularly preferably from 200 to 1500 bar.

If an aperture plate system is used for the dispersion, the diameter of the nozzles can be varied according to the invention by exchanging the nozzles. At the beginning, nozzles having a diameter greater than the diameter of the largest CNT agglomerates are preferably used in order to prevent a blockage. As the degree of dispersion increases, the nozzle diameter is reduced in order to achieve higher pressure losses and hence higher energy inputs. A rough formula for the relationship between nozzle diameter, pressure loss and throughput is, as is known to the person skilled in the art, $$\Delta p = \zeta \frac{1}{2} \rho u^2$$

where $\Delta p$ is the pressure loss in pascals, $\zeta$ is a factor which depends on the geometry of the nozzle and is typically from 0.7 to 1, $\rho$ is the density in kilograms per cubic meter, u is the mean speed of the fluid, wherein $$u = \frac{\dot{V}}{A_D}$$

where $\dot{V}$ is the volume flow and $A_D$ is the cross-sectional area of the nozzle. For nozzles having a circular cross-section $$A_D = \frac{\pi}{4} D^2$$

where D is the nozzle diameter. The preferred nozzle diameter at the start of the dispersion using hole-type nozzles is from 1.5 mm to 0.6 mm, and the preferred pressure loss is from 20 to 100 bar.

A spring-loaded annular gap nozzle can also be used according to the invention. Such a spring-loaded annular gap nozzle, also referred to as a radial nozzle or flat nozzle, is known from the literature, for example, for the emulsification or homogenisation of milk. It consists substantially of a central inlet which leads to a spring-loaded plate fitted into a seat. The pressure of the liquid in the inlet lifts the plate and allows the liquid to flow radially outwards through the nozzle. The pressure loss in the nozzle can be set by the spring bias. Particles which are clamped between the plate and the seat block the flow and consequently lead to opening of the seat. This has the advantage that a spring-loaded annular gap nozzle has a markedly reduced tendency to becoming blocked. Therefore, it does not have to be replaced, and the step of pre-dispersion can be omitted.

Downstream of the nozzle of the high-pressure homogeniser, the CNT-containing mixture is preferably fed to a storage container. The storage container may or may not be stirred; preferably it is stirred.

In preferred forms of steps 2., 3. and 4., the CNT-containing mixture is removed from the storage container again and fed to the high-pressure homogeniser once more, which feeds it to the storage container again (loop mode). This preferred form has the advantage of being simple, but it can have the result that some CNTs pass more frequently and other CNTs less frequently through the nozzle.

In a further preferred form, the CNT-containing mixture is guided in a cascade of two or more storage containers, it being fed in each case from one storage container to the next. This can take place continuously or discontinuously. This is also carried out in loop mode, that is to say the CNT-containing mixture passes through the nozzle several times, but with a narrower residence time distribution.

In a further preferred form, the product is transferred alternately into two receiver containers (from receiver container A via the nozzle to receiver container B and then from receiver container B again via the nozzle to receiver container A), whereby as narrow a residence time distribution as possible is achieved.

The initial dispersion typically contains concentrations of CNTs of from 0 to 7 wt. %, preferably from 1 to 6 wt. % and particularly preferably from 3 to 5.5 wt. %.

During step 3, in order to prepare the initial dispersion, further CNTs are added continuously or discontinuously to the mixture by increasing the concentration of CNTs in the storage container. This can be effected, for example, by adding CNTs in dry form to the receiver container over a period of typically several minutes ("further metering"). However, it is also possible, for example, for a highly concentrated mixture of CNTs and liquid to be added to the storage container. A stirred receiver container is thereby preferred in order to wet the CNTs with the previously prepared dispersion and mix them therewith.

In a preferred variant, this initial dispersion is prepared in loop mode. Further metering of the CNTs particularly preferably takes place only when the effect of the decrease in viscosity has occurred. Surprisingly, it has been found that, in the high-pressure homogeniser, the viscosity of a CNT-containing dispersion initially increases as the dispersing time progresses and then decreases markedly once a maximum has been passed. This effect of the decrease in viscosity is not proportional to the deagglomeration of the CNTs and can readily be determined by checking the viscosity of the CNT-containing dispersion at brief intervals, for example as described in the implementation examples.

The amount of CNTs added is typically from 0.1 wt. % to 5 wt. %, preferably from 0.5 to 3 wt. % and particularly preferably from 1 to 2.5 wt. %. During the addition, the dispersion can be stopped or can continue.

Following the further metering, a further dispersion takes place (step 4). This further dispersion is preferably likewise carried out in the high-pressure homogeniser. The end point of the dispersion is preferably determined by a further viscosity maximum being reached and exceeded in the CNT dispersion. In loop mode, typically from ¼ to 50 passes are made during the further metering, preferably from ½ to 30 and particularly preferably from 1 to 16 passes.

The operation of further metering with subsequent dispersion can be carried out according to the invention once or several times; from one to 15 times is preferred.

In a further preferred variant, an initial dispersion is prepared as described above, wherein the effect of the decrease in viscosity particularly preferably occurs. The CNTs are then added continuously to a receiver container, which is preferably stirred, while the dispersion continues. The throughput of CNTs is based on the time which a circuit in the high-pressure homogeniser requires, as well as on the total mass of the dispersion, and is typically from 0.03 to 2 wt. % per circuit, preferably from 0.05 to 1.5 wt. % per circuit and particularly preferably from 0.1 to 1 wt. % per circuit.

The addition of further CNTs to the dispersion is carried out until the desired final concentration is reached. Typically, concentrations of CNTs which contain up to 20 wt. %, preferably from 1 to 18 wt. %, particularly preferably from 5 to 16 wt. % and from 5.5 to 15 wt. % and from 6 to 15 wt. % CNTs can be established. In further preferred embodiments, the dispersion contains from 7 to 15 wt. % and particularly preferably from 8.0 to 14.5 wt. % CNTs. In particular, dispersions containing more than 8 wt. % CNTs can be prepared. All indicated percentages by weight are based on the total mass of the dispersion.

The continuous addition, the mixing and/or the dispersion can also be interrupted for a short or longer time without adversely affecting the result of the dispersion.

The steps according to the invention of preparing an initial dispersion with subsequent further metering of CNTs and after-dispersion are preferably followed by a step of final dispersion (step 4) in order further to comminute residual agglomerates of CNTs and prepare the final dispersion.

By means of the process according to the invention it is possible to prepare fine dispersions of CNTs, wherein concentrations of 8 wt. % and more can themselves be prepared with high throughputs. This was due especially to the surprising observation that the viscosity of a mixture of CNTs first increases and then decreases again as the dispersion continues. The addition of the further CNTs is therefore preferably carried out when the viscosity decreases again.

The process according to the invention has the advantage that it can be scaled up. The effective throughput is, for example, ≥2 liters/hour and can be increased further, for example to ≥10 liters/hour and ≥50 liters/hour.

The dispersions prepared according to the invention preferably have a relatively low viscosity—in comparison with other preparation processes—while at the same time having good conductivity. The dispersions according to the invention are stable for >1 month, preferably >3 months, which is shown by a small change in the conductivity value during storage of the dispersion over that period. The dispersions have small mean particle diameters. This value can be determined, for example, by means of laser diffraction spectrometry (an example of a device is the Mastersizer MS 2000 with Hydro S dispersion unit from Malvern). Compared with other dispersing processes, in particular milling, the CNTs are subjected to less stress, which is shown by less shortening of the CNTs. The good dispersing quality also manifests itself in the good conductivities of the dispersions and of the coatings and materials produced therefrom.

Such dispersions of carbon nanotubes can be used commercially in many different ways. One example is the use as conductive lacquers and coatings, for example as conductive inks for the production of electrically conductive surfaces or electric circuits, as described, for example, in DE102008008837 A1. In this case, the production of the circuits or electrically conductive surfaces is carried out by printing. The liquid used thereby is then removed, for example by drying. Various processes can be used in the printing, such as, for example, inkjet printing or screen printing. In this manner, tracks can be produced on RFID chips, for example.

Further examples of the use of dispersions containing carbon nanotubes are conductive precursor materials for the production of polymer materials and further starting products for the production of CNT-containing composites, for example for the incorporation of CNTs into different matrices, in particular into polymers. Dispersions containing carbon nanotubes are additionally used in glass fibre sizes, for the impregnation of ceramics, for reinforcing concrete, for modifying latex (rubber, etc.) and in dispersion paints (deep black, electromagnetic shielding).

EXAMPLES

Conductivity Determination of a Dried Dispersion

The conductivity of the dried dispersions was determined by diluting the dispersion in question with distilled water so that the concentration by mass was 0.5%. In each case 200 microliters were then drawn up with a micrometer syringe and added to a rectangular well with removable walls measuring one centimeter by two centimeters. The dispersion was then dried for at least four hours in a drying cabinet at 60° C. The walls of the well were then removed so that a "spot" of dried dispersion measuring one centimeter by two centimeters was left on the substrate. The dried suspension was then contacted electrically with the aid of metal clamps on both sides on the narrow sides of the rectangle so that a square measuring 1 centimeter by one centimeter could be measured in respect of electrical conductivity. As a rough approximation, about 0.5 g of CNTs is present in such a square. The resistance of this square was then measured using a Multimeter ITT Instruments MX52S.

The thickness of the layers was measured for different tests and was approximately from four to six micrometers.

Example 1

Effect of the Decrease in Viscosity

Step 1.: Preparation of the Mixture 5460 grams of distilled water, 240 grams of sodium salt of a ligninsulfonic acid with MW=52,000 g/mol ("LSSNa") from Sigma-Aldrich Chemie GmbH, Germany, and 300 g of Baytubes® C 150 P (manufacturer: Bayer MaterialScience AG, Germany) were placed in a container.

Step 2.: Pre-Dispersion

This mixture was homogenised for four minutes with a Kotthoff "Mischsirene" (Kotthoff "Mischsirene" FLUKO laboratory dispersing machine LDF for batch operation, which is a rotor-stator system in batch operation) of the LDF type. The dispersion was then transferred to a stirred container and homogenised by means of a pneumatic pump. The product was in each case fed back to the receiver container. In a first step, the product was pumped in a loop, in a second step via a nozzle of diameter of 1.4 mm with a throughput of 200 kg/h.

Sample 1-1 was removed.

Step 3a: Homogenisation of the Pre-Dispersion Until the Viscosity Maximum is Exceeded 5610 grams of the dispersion prepared in step 2. were dispersed in a jet disperser with different nozzles (for the diameter of the nozzles and the number of nozzle apertures see Table 1). After passing through the nozzle, the product was fed back into the main container again. The pressure that was established was thereby measured, as was the throughput by level calibration.

After the individual steps, samples were taken and the viscosities were determined. They were determined using a rheometer of type "Physica MCR 301" in a Couette gap at T=25° C. Shear rates of from 0.01 to 100 reciprocal seconds were first set, with the shear rate increasing.

Table 1 below gives an overview of the individual steps and the measured viscosities at 0.1/s, 1/s and 10/s. When carrying out the test it became apparent that samples 1-4 and 1-5 were far less viscous than samples 1-1, 1-2 and 1-3.

TABLE 1

Effect of the decrease in viscosity in a LSSNa-containing CNT dispersion

| Sample no. | Number of nozzle apertures | Nozzle diameter mm | Pressure bar | Time min | Throughput 1st measurement kg/h | Throughput 2nd measurement kg/h | Viscosity at 0.1/s Pa*s | 1/s Pa*s | 10/s Pa*s |
|---|---|---|---|---|---|---|---|---|---|
| 1-1 | | | | | | | 14.4 | 1.660 | 0.236 |
| 1-2 | 2 | 1.4 | 50 | 20 | 311 | 294 | 21.5 | 2.480 | 0.971 |
| 1-3 | 4 | 0.75 | 40 | 20 | 251 | 247 | 166. | 18.300 | 2.870 |
| 1-4 | 1 | 0.6 | 160 | 40 | 208 | 205 | 0.057 | 0.049 | 0.052 |
| 1-5 | 1 | 0.4 | 240 | 20 | 110 | 110 | 0.057 | 0.049 | 0.040 |

FIG. 1 shows the viscosity values from Table 1 in graphic form.

Example 2

Effect of the Decrease in Viscosity

Step 1.: Preparation of the Mixture 2275 grams of water were placed in a 3-liter glass beaker, and 100 g of polyvinylpyrrolidone 40T ("PVP 40T") from Sigma-Aldrich Chemie GmbH, Germany were dissolved therein while stirring by means of a cross-arm stirrer of diameter 60 mm and speed 500/min. 125 grams of Baytubes® C 150P CNTs were added.

Step 2.: Pre-Dispersion

Using a Kotthoff "Mischsirene", the mixture was homogenised for four minutes analogously to Example 1. The product was then transferred to a stirred container. In a first step, the product was pumped in a loop, in a second step via a nozzle of diameter 1.4 mm with a throughput of 200 kg/h.

Step 3a: Homogenisation of the Pre-Dispersion Until the Viscosity Maximum is Exceeded 2282 grams of the dispersion prepared in the pre-dispersion were dispersed in a jet disperser with different nozzles (for the diameter of the nozzles and the number of nozzle apertures see Table 2). After passing through the nozzle, the product was fed back into the main container again.

Table 2 below gives an overview of the individual steps and the measured viscosities at 0.1/s, 1/s and 10/s.

TABLE 2

Effect of the decrease in viscosity in the case of a PVP 40T-containing CNT dispersion

| Sample no. | Number of nozzle apertures | Nozzle diameter mm | Pressure bar | Time min | Throughput 1st measurement kg/h | Throughput 2nd measurement kg/h | Viscosity at 0.1/s Pa*s | 1/s Pa*s | 10/s Pa*s |
|---|---|---|---|---|---|---|---|---|---|
| 2-1 | 2 | 1.4 | 50 | 15 | 217 | 200 | 50.2 | 5.94 | 1.76 |
| 2-2 | 4 | 0.75 | 40 | 15 | 199 | 202 | 50.1 | 4.98 | 1.24 |
| 2-3 | 1 | 0.6 | 150 | 15 | 192 | 195 | 5.37 | 1.95 | 0.628 |
| 2-4 | 1 | 0.4 | 240 | 15 | 112 | 113 | 0.308 | 0.163 | 0.101 |
| 2-5 | 1 | 0.3 | 270 | 15 | 78 | 80 | 0.342 | 0.169 | 0.101 |

Figure 2:
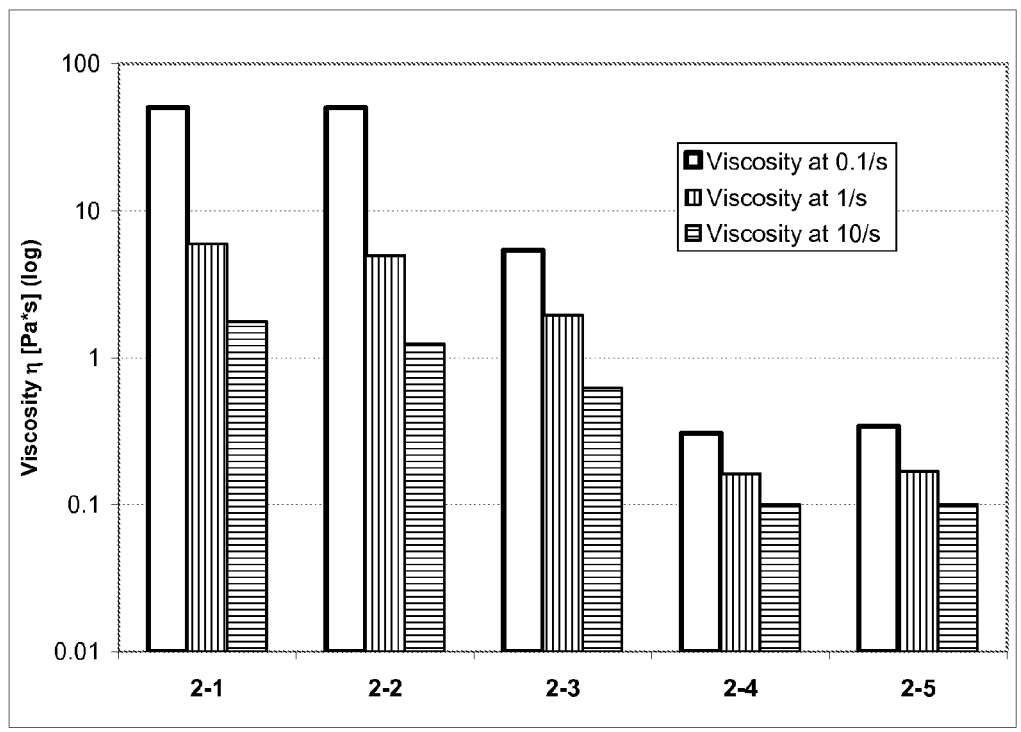
FIG. 2 illustrates viscosity values from Example 2, in graphical form.

FIG. 2 shows the viscosity values from Table 2 in graphic form.

Example 3

Preparation According to the Invention of a LSSNa-Containing Dispersion of Carbon Nanotubes Step 1.: Preparation of the Mixture 5160 grams of distilled water, 360 grams of LSSNa and 300 g of Baytubes® C 150 P were placed in a container.

Step 2.: Pre-Dispersion

The mixture prepared in step 1 was homogenised for four minutes using a Kotthoff "Mischsirene" (see Example 1) of the LDF type. The dispersion was then transferred to a stirred container and homogenised by means of a pneumatic pump. The product was in each case fed back into the receiver container. In a first step, the product was pumped in a loop, in a second step via a nozzle of diameter 1.4 mm with a throughput of 200 kg/h.

Step 3.: Preparation of the Initial Dispersion 5547 grams of the dispersion prepared in step 2 were dispersed in a jet disperser with different nozzles (for the diameter of the nozzles and the number of nozzle apertures see Table 2). After passing through each nozzle, whereby the process parameters indicated in Table 3 were established, the product was in each case fed back into the main container again.

TABLE 3

| Sample no. | Pass | Number of nozzle apertures | Nozzle diameter mm | Pressure bar | Time min |
|---|---|---|---|---|---|
| 3-1 | — | — | — | — | — |
| 3-2 | a) | 2 | 1.4 | 50 | 25 |
| 3-3 | b) | 4 | 0.75 | 40 | 25 |
| 3-4 | c) | 1 | 0.6 | 160 | 25 |

After pass c), that is to say in sample no. 3-4, the effect of the decrease in viscosity was observed.

Further Metering and after-Dispersion

After pass c), a further 54 grams of CNTs were added to the main container. This mixture was then homogenised in succession by the procedure consisting of the following passes d) 25 minutes in the jet disperser with 2 nozzles, 1.4 mm
e) 25 minutes in the jet disperser with 4 nozzles, 0.75 mm
f) 25 minutes in the jet disperser with 1 nozzle, 0.6 mm.

In this case too, the product was in each case fed in a loop back into the buffer container. After the addition of the CNTs during pass d), an increase in the viscosity was again observed, although this was less pronounced due to the smaller amount of undispersed CNTs (1 wt. %) than at the start of the main dispersion (5 wt. %). During the further passes, the effect of the decrease in viscosity was again observed.

This procedure of further metering and after-homogenisation was repeated a further two times according to the above-described procedure consisting of further metering and passes d) to f). Here too, an increase in the viscosity was observed after each addition, and a decrease was in turn observed as the procedure continued. A total of 162 grams of CNTs was accordingly added in three steps.

Step 4.: Preparation of the Final Dispersion

Starting from the initial dispersion, which was obtained after the third step of further metering, homogenisation was finally carried out via a nozzle of 0.4 mm diameter for 60 minutes. Sample 3-5 was thereby obtained.

Finally, the sample was divided, and each portion was heated to 59° C. and guided twice via a nozzle of diameter 0.2 mm at a pressure of 1000 bar, without backmixing. After combining the portions again, sample 3-6 was obtained.

The particle size of sample 3-6 was determined by means of laser diffraction using a Mastersizer 2000 Hydro S from Malvern. The D90 value determined by this process was 1.62 micrometers, a very good dispersing quality. The solids content was determined by means of a drying balance. It was 14.1 wt. %, based on the total weight of the dispersion. The content of CNTs is 7.9 wt. % CNTs/total weight of the dispersion.

The viscosity of sample 3-6 was determined after one week using a rheometer of type "Physica MCR 301" in a Couette gap at T=25° C. Shear rates of from 0.01 to 100 reciprocal seconds were initially set, with an increasing shear rate. The viscosities are:

| Viscosity of sample 3-6 at | | |
|---|---|---|
| 0.1/s Pa*s | 1/s Pa*s | 10/s Pa*s |
| 155 | 29 | 6 |

Conductivities were determined on the dried dispersion by means of the process described above. The conductivity of five 1 cm*1 cm squares with 0.5 milligram of CNTs was measured and values from 30.8 ohms to 43.9 ohms were determined, the mean was 37.4 ohms. With a layer thickness of 4 micrometers, this corresponds to a conductivity of approximately 6700 siemens per meter.

Example 4

Figure 3:
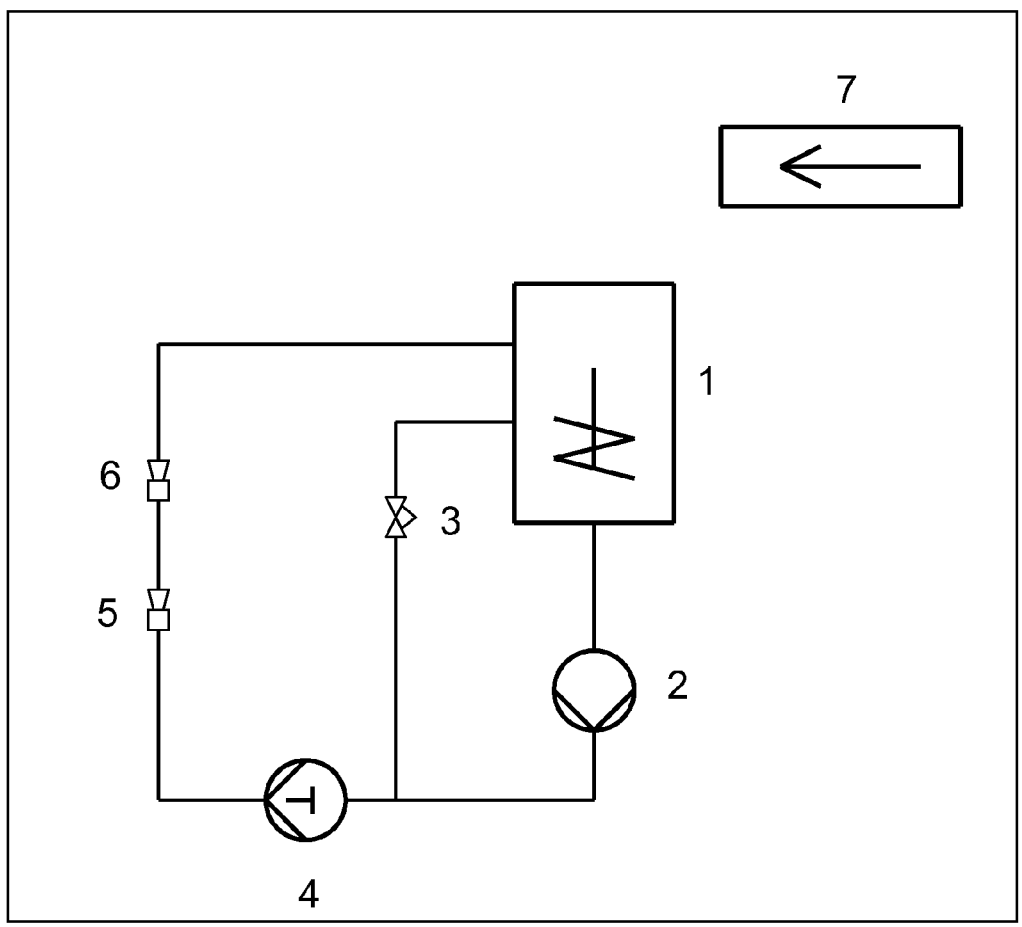
FIG. 3 Illustrates the apparatus used in the practice of the invention

Preparation According to the Invention of a PVP-Containing Dispersion of Carbon Nanotubes The apparatus shown in FIG. 3 was used. A stirred container 1 has at the outlet a pump 2 which is able to feed the product back into the stirred container 1 again via a pressure retention valve 3. It can further flow to the high-pressure pump 4. Normally, the throughput of the pump 2 will be higher than the throughput of the high-pressure pump 4, which gives the possibility of adjusting the primary pressure of the high-pressure pump 4 via the pressure retention valve 3. The portion of the product that passes via the high-pressure pump 4 can be broken down by one or more nozzles arranged in succession. In this case, the nozzles were two spring-loaded annular gap nozzles 5 and 6. The stirred container 1 has the possibility of metering in further solids and liquids from above.

Step 1.: Preparation of the Mixture 8509 grams of distilled water, 573 grams of polyvinylpyrrolidone K 30 ("PVP K30") from Sigma-Aldrich Chemie GmbH, Germany, and 478 g of Baytubes® C 150 P were placed in a container.

Step 2.: Pre-Dispersion

This mixture was homogenised for four minutes using a Kotthoff "Mischsirene" of the LDI type. The dispersion was then transferred to a stirred container and homogenised by a pneumatic pump. The product was in each case fed back into the receiver container. In a first step, the product was pumped in a loop, in a second step via a nozzle of diameter 1.4 mm with a throughput of 200 kg/h.

Step 3.: Preparation of the Initial Dispersion

The mixture was then transferred to the stirred container 1. The pump 2 was started and the pressure downstream of the pump 2 was set to approximately 2 bar with the valve 3. The high-pressure pump 4 was then started and the pressure downstream of the high-pressure pump 4 was set at 1200 bar via the valve 5 and the pressure downstream of the valve 5 was set at about 200 bar via the valve 6. The pressure loss across the valve 5 was accordingly about 1000 bar and across the valve 6 about 200 bar. The throughput of the high-pressure pump 4 was between 110 and 120 liters per hour throughout.

Further Metering and After-Dispersion 20, 25, 30, 35, 40, 55, 60, 65, 70, 75, 80 and 85 minutes after starting, in each case 37 grams of CNTs were added over a period of about one minute.

Step 4.: Preparation of the Final Dispersion

After the last addition of CNTs, the test was continued for a further 80 minutes using the parameters described in step 3 and was then terminated.

The effective throughput of the installation was accordingly 9 liters/165 minutes=3.2 liters per hour.

Solids content of the final dispersion according to Example 4: 14.4 wt. %, based on the total weight of the dispersion. The content of CNTs is 8.9 wt. % CNTs/total weight of the dispersion.

The particle sizes were determined as indicated above. The D90 value was 1.7 micrometers.

The invention claimed is:

1. Process for the preparation of a dispersion containing carbon nanotubes, which comprises the following steps:
   1. preparation of a mixture of dispersing agent, dispersing aid and, optionally, carbon nanotubes,
   2. if carbon nanotubes have been added in step 1, optional pre-dispersion of the mixture from step 1,
   3. dispersion of the mixture from step 1 or of the pre-dispersed mixture from step 2, wherein the dispersion is carried out using a high-pressure homogenizer, during which the viscosity of the dispersion increases to a maximum and then decreases and wherein all or part of the mixture is guided in a loop during the dispersion, wherein further CNT agglomerates are added continuously or discontinuously to the mixture during the dispersion, an initial dispersion being obtained,
   4. further dispersion of the initial dispersion obtained in step 3 in the high-pressure homogeniser, optionally in loop mode, a final dispersion being obtained.

2. Process according to claim 1, wherein the addition of the further CNT agglomerates in step 3) is carried out at a time at which the viscosity of the dispersion has passed the maximum.

3. Process according to claim 1, wherein a final dispersion having a concentration up to 20 wt. % CNTs, based on the total mass of the dispersion, is obtained and the effective throughput is greater than 2 liters per hour.

* * * * *